(12) United States Patent
Pyrhönen

(10) Patent No.: US 6,184,606 B1
(45) Date of Patent: Feb. 6, 2001

(54) ROTOR FOR AN ELECTRIC MACHINE AND A METHOD IN AN ELECTRIC MACHINE

(75) Inventor: Juha Pyrhönen, Lappeenranta (FR)

(73) Assignee: Rotatek Finland Oy, Lappeenranta (FI)

( * ) Notice: Under 35 U.S.C. 154(b), the term of this patent shall be extended for 0 days.

(21) Appl. No.: 09/194,428

(22) PCT Filed: May 30, 1997

(86) PCT No.: PCT/FI97/00337

§ 371 Date: Nov. 30, 1998

§ 102(e) Date: Nov. 30, 1998

(87) PCT Pub. No.: WO97/45941

PCT Pub. Date: Dec. 4, 1997

(30) Foreign Application Priority Data

May 30, 1996 (FI) ......................................................... 962270
Apr. 18, 1997 (FI) ......................................................... 971660

(51) Int. Cl.[7] ............................. H02K 1/00; H02K 17/16; H02K 1/22

(52) U.S. Cl. ............................. 310/182; 310/211; 310/262

(58) Field of Search .................................... 310/182, 211, 310/262, 210, 261

(56) References Cited

U.S. PATENT DOCUMENTS

| 4,309,635 | 1/1982 | Sei et al. . |
|---|---|---|
| 4,577,128 | 3/1986 | Gould et al. . |
| 5,473,211 | 12/1995 | Arkkio . |

FOREIGN PATENT DOCUMENTS

| 2 023 849 | 11/1971 | (DE) . |
|---|---|---|
| 2 262 587 | 6/1974 | (DE) . |
| 3 127 964A1 | 1/1983 | (DE) . |
| 3 127 965A1 | 1/1983 | (DE) . |
| 31 31 772A1 | 2/1983 | (DE) . |
| 33 06 548A1 | 8/1984 | (DE) . |
| 1 427 818 | 3/1976 | (GB) . |
| 2 134 739 | 8/1984 | (GB) . |
| WO97/48174 | 12/1997 | (WO) . |

Primary Examiner—Thomas M. Dougherty
Assistant Examiner—Guillermo Perez
(74) Attorney, Agent, or Firm—Arent Fox Kintner Plotkin & Kahn PLLC

(57) ABSTRACT

A solid rotor for an electric machine includes a short circuit ring of a metal material having good electrical conductivity. The short circuit ring is attached to an end face of the rotor, and includes at least two portions formed of different materials. A first portion of the short circuit ring is of a material which has essentially similar characteristics to the characteristics of the material of the rotor.

22 Claims, 4 Drawing Sheets

ROTOR FOR AN ELECTRIC MACHINE AND A METHOD IN AN ELECTRIC MACHINE

Figure 1:
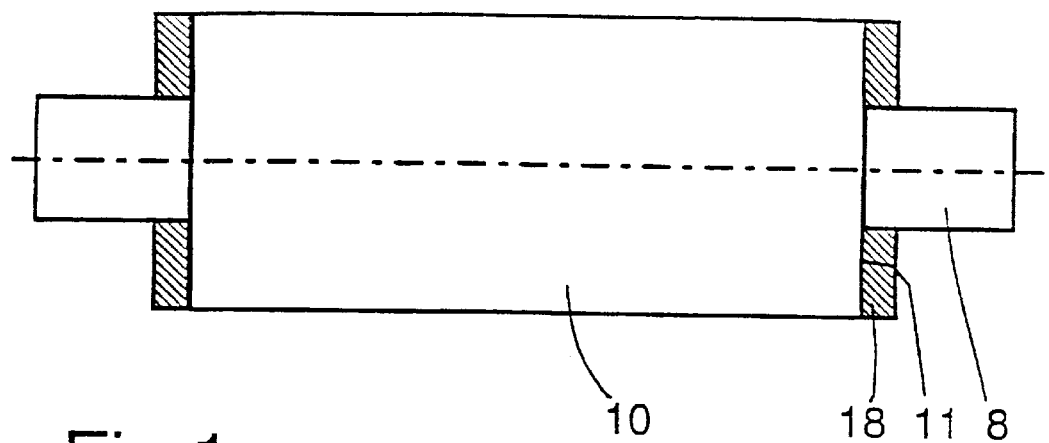

The present invention relates to a solid rotor means of an electric machine in accordance with the preamble of claim 1. The present invention relates further to a method in accordance with the preamble of claim 9 for improving the characteristics of a solid rotor means.

The electric motors operating in accordance with the principles of an induction machine have usually been machines using so called laminated rotors. Related problems of these are the vibrations which occur already at relatively low rotational speeds and are due to the structure of the rotor, especially due to the poor bending stiffness and partly also due to the poor torsional stiffness thereof, and the changes/wandering in the balance thereof. The so called critical frequency of the laminated rotor is met at relatively low rotational speeds, which are way too low, especially in view of rotational speeds which are raised from the normal. The manufacture of the laminated rotor requires also several working stages and special tools and machines, the manufacture thereof being thus slow and expensive to accomplish.

Therefore, it is prior known to use in the electric motors utilizing high rotational speeds so called solid rotors manufactured from steel, eg. by a lathe from a uniform billet, by means of which an essentially more rigid and stiff structure is achieved. The solid rotor enables also a good and precise balancing, and the rotor also remains in the balance at different rotational speeds This enables the utilization of ball bearings in the rotor bearings.

However, the solid rotor causes also an increase in the rotor resistance and an essential decrease in the power ratio of the machine, this being typically about 0.6–0.7. The coefficient of efficiency for this kind of rotor is poor. The solid rotors, which are manufactured from one piece and in most cases are smooth from the outer periphery thereof, are, however, commonly used in short circuit motors using a rotational speed which is essentially higher than in normal motors, such as up to 200 000 1/min. However, the problem of these is also the above mentioned poor coefficient of efficiency and overheating, even in desired, such as speeds less than 20 000 1/min.

One example of an improved solid rotor application is disclosed by GB patent No. 1 427 818. A rotor means thereof comprises a cylindrical rotor shaft of low carbon iron which is provided with so called copper squirrel cage for decreasing the rotor resistance.

Although the solution provides advantages in the rigidness of the rotor and decreases the resistance, the poor efficiency is, however, still a problem. The losses lead, in addition to the poor efficiency, to a remarkable overheating during the use. Different cooling systems are provided so as to solve the overheating problem, but the power required by them has further decreased the net efficiency. A remarkable problem in view of the manufacture has been the difficulty in attaching the essentially wide semispherical copper portions of the squirrel cage and the fastness thereof in the rotor, especially in higher rotational speeds. In addition, the citation does not disclose or suggest any manner to utilize the disclosed rotor means in other types of motors than in the high speed motors. The disclosed solution has not, eg. due to the above reasons, gained any common success in the field of the electric motors.

FI patent 92114 discloses a rotor for an induction electric machine, the circumference whereof is coated with an electrically conductive coating for the purposes of removing the above mentioned problems. However, the coating is difficult to accomplish and the fastness thereof has proven to be problematic. An additional disadvantage is caused by the fact that in many coating methods the rotor becomes strongly heated, which has a negative effect to the mechanical properties of the rotor. Thus the solution has not been able to solve the problems of the solid rotor machines in a satisfying and economical manner.

The object of the present invention is to overcome the disadvantages of the prior art and to provide a totally new type of solution for improving the characteristics of a solid rotor for an electric machine.

It is also an object of the present invention to provide an induction electric machine solution, which has an essentially improved efficiency and other properties thereof when compared to the known solutions and in which solution there are no significant overheating problems, as is the case with the prior art machines.

It is also an object of the present invention to provide a rotor means having an essentially low rotor resistance.

It is also an object of the present invention to provide a structure and a method for providing a machine which can be used within a wide range of rotational speeds.

An object of the present invention is to provide a solid rotor machine structure having an essentially low field weakening point. This enables eg. loading of the machine by a constant power in an essentially wide range of rotational speeds.

An object of the invention is also to provide a rotor means which is easy to manufacture and thus economical to implement.

An object of the invention is also to provide a machine structure comprising a solid rotor in which an essentially small air gap can be used without any disadvantageous effects, whereby it is possible to increase the efficiency coefficient.

An object of the invention is to provide a electric machine structure having a size and weight which are smaller than those of the known induction machine solutions providing an equivalent power.

The invention is based on that surprising observation that characteristics, which are improved from the prior known solid rotor machines, can be achieved by a solid rotor means which is provided at the end faces thereof with short circuit rings made from material having a good electrical conductivity.

More precisely, the structure according to the present invention is mainly characterized by what is disclosed in appended claims 1 . . . 8 and especially by the characterizing portion of claim 1. The method according to the present invention is mainly characterized by what is disclosed in appended claims 9 . . . 11 and especially by the characterizing portion of claim 9.

According to a preferred embodiment of the present invention the apparatus comprises an essentially rigid, from one piece manufactured solid rotor means, the end faces thereof being suitably provided with short circuit ring means which preferably are of copper or similar material having a good electrical conductivity, such as aluminium, bronze, brass, silver, gold etc. material or alloy per se known.

According to one preferred embodiment the end or short circuit ring is essentially deep (high), by means of which an advantage is obtained in the form of a further decrease in the rotor resistance. According to another preferred embodiment the rotor means is manufactured such that the circumferential shape thereof is machined by a lathe from a suitable steel billet, and subsequently a short circuit ring made of a bimetal sheet (eg. FeCu) is attached thereto preferably eg. by electron beam welding (EB welding), friction welding or laser welding or by brazing such that the essentially corresponding steel materials are attached to each other. By this means it is possible to manufacture by a per se known manner a rigid joint which can stand the stresses caused by eg. the high rotational speed in an easy and fast manner. According a still further preferred form rotor bar means provided from a bimetal sheet are used.

Significant advantages are obtained by means of the present invention. The torque output capability and efficiency of a solid rotor machine is essentially improved when compared to the known solutions, while the problem relating to the machine overheating is significantly decreased. By means of the invention the size and weight of the motor are decreased, when compared to known motors having an equal performance. The motor according to the invention gives an essentially even maximum power in an essentially wide rotational speed range. Due to the good characteristics, such as the small size and weight and the wide rotational speed range and the even power curve, the electric machine structure and method of the present invention is applicable in many various instances, as the same motor can be applied to several different uses. The manufacture of the rotor means of the invention is easy to accomplish, but still a durable and reliable structure, eg. in view of the fastness of the short circuit rings, is provided.

In the following the present invention and the other objects and advantages thereof will be described by way of examples with reference to the annexed drawings, in which similar reference characters throughout the various figures refer to similar features. It should be understood that the following exemplifying description of the invention is not meant to restrict the invention to the specific forms presented in this connection but rather the present invention is meant to cover all modifications, similarities and alternatives which are included in the spirit and scope of the present invention, as defined by the appended claims.

FIG. 1 is a simplified schematic side view of a solid rotor means of an electric machine according to the present invention.

Figure 2:
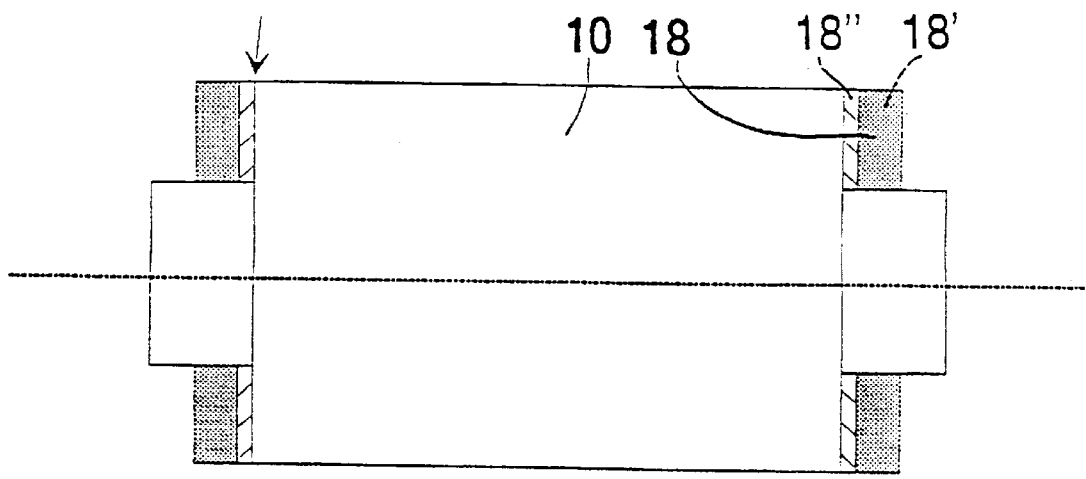

FIG. 2 discloses a sectional side view of one embodiment of the rotor means of the invention.

Figure 3:
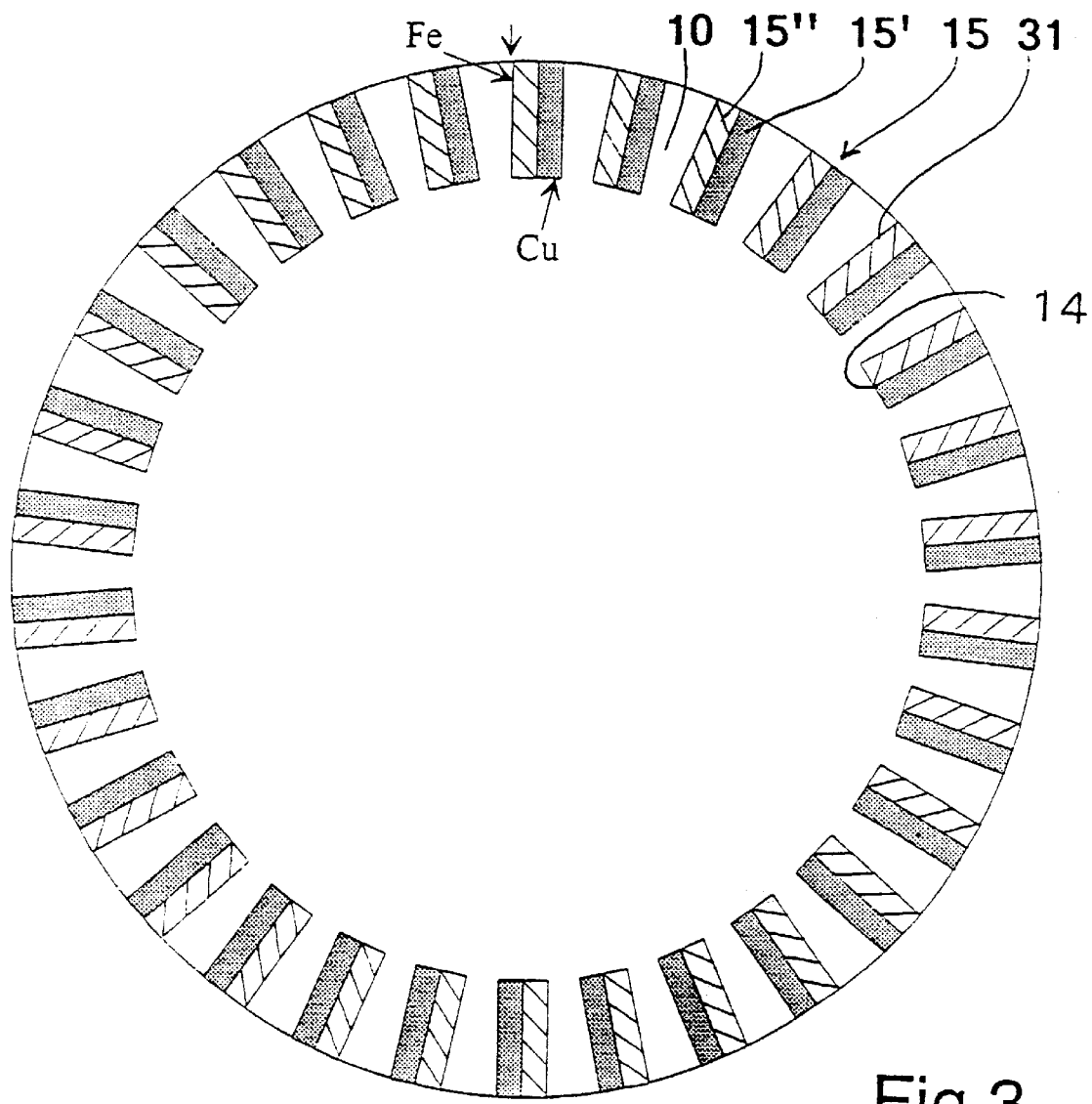

FIG. 3 discloses a sectional view of one additional embodiment of the rotor means of the invention.

Figure 4:
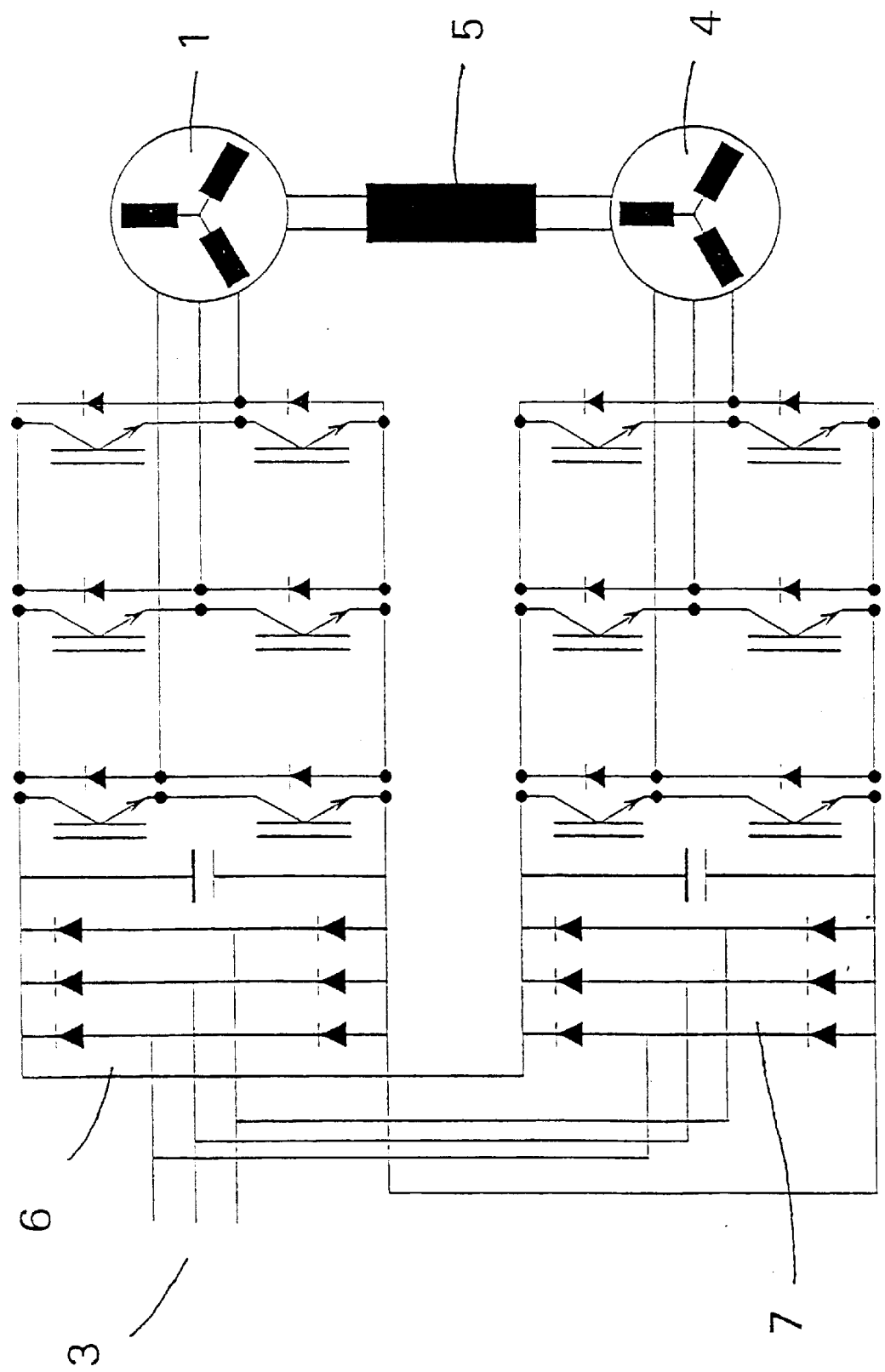

FIG. 4 discloses the testing arrangement for table 5.

Figure 5:
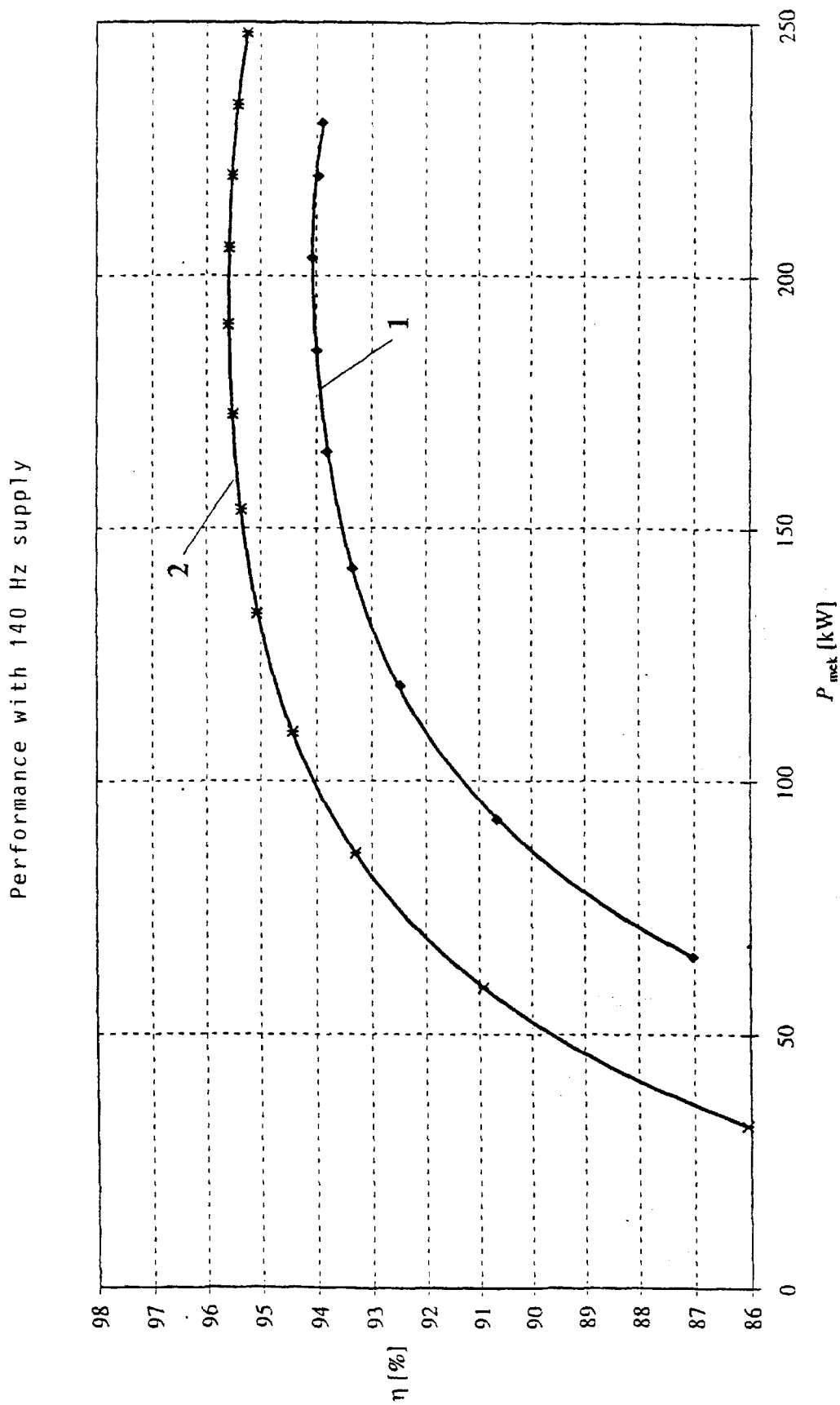

FIG. 5 discloses a table showing test results based on a comparison.

FIG. 1 discloses one solid rotor means 10, which is manufactured from a uniform steel billet, according to the present invention. FIG. 1 discloses also short circuit rings 18 of copper which are attached on the ends of the rotor means 10, ie. the face surfaces 11 thereof. It is possible to attach the copper rings 18 to the ends 11 of the rotor 10 eg. by friction, explosive or laser welding. The parameters, which are given only as an example of the possible rotor parameters, of one test rotor constructed according to the invention, were as follows: material Fe52, diameter 98.5 mm and length 100 mm, the thickness of the used copper short circuit rings 10 mm. The short circuit rings may extend essentially over the entire area of the free end face 11, as is shown by FIG. 1, or only within a fraction of the circumference thereof.

The short circuit rings 18 cause an essential decrease to the rotor resistance of the solid rotor 10, which in turn has an advantageous effect to the efficiency of the machine. By means of the solution it is possible to shorten the length of the rotor, and to provide a more compact machine structure than are the machines of the prior art.

A preferred short circuit ring material is for instance copper. Other possibilities are eg. aluminium, bronze, brass, silver, gold and the different combinations of these which provide sufficient properties to provide a sufficient electrical conductivity through the face surface 11 of the rotor 10 so as to decrease said rotor resistance.

FIG. 2 discloses one solution which is preferred from the manufacturing aspects thereof, in which the end ring 18 is manufactured from so called FeCu sheet (steel-copper sheet). This bimetal structure 18', 18" can be provided from other combinations as well, such as steel-aluminium, steel-brass etc. This kind of premanufactured bimetal sheet material, in which the different materials, such as copper and steel 18' and 18" may be attached to each other eg. by rolling or explosive welding or by blast compaction based on shock wave technology, is known by the skilled person, and different kinds of bicomponent sheets are also commercially available.

In the solution disclosed by FIG. 2 the steel portions 18" of the end plate 18 can preferably be welded eg. by electron beam welding (EB-weiding) or laser welding to the rotor material 10 from the locations indicated by an arrow. Thus the rotor means 10 of FIG. 2 is especially easy to manufacture as it is possible to weld or otherwise attach the bimetal sheet from the location designated by the arrow only from the steel portion side thereof to the rotor 10 made of steel. In other words, this enables an attachment of two smooth joint surfaces of essentially similar material to each other by simple and cheap attachment methods while the essentially difficult attachment of the copper or similar short circuit ring material to steel or similar can be accomplished as mass production in an industrial environment. Further saving is obtained, for instance, due to the fact that the requirements for the preparations, such as in view of the smoothness and the level of oxidization of the joint surfaces, are not that strict as what is the case, for instance, in view of copper to iron joints according to FIG. 1.

A preferred additional embodiment of the rotor means 10 is disclosed in the schematic cross sectional view of FIG. 3, in which the rotor 10 is provided with grooves 14 on the circumferential surface thereof. According to this alternative each of the groove means 14 is further provided with bars of an appropriate bimetal sheet, which sheet may preferably be a iron-copper sheet (FeCu) as was discussed above. The axially extending rotor bar 15 of the squirrel cage means disposed within the groove may be attached from only one side 31 thereof to the groove. The attachment can preferably be accomplished by eg. electron beam welding (EB welding) or laser welding. By means of this solution it is possible to obtain advantages eg. in view of the required amount of welding.

In addition, even though it is not always necessary, it may be advantageous to leave even a small air gap between the groove 14 and the portion 15. The air gap may preferably be about 0.1–2 mm.

The shape of the grooves 14 receiving the rotor bars 15 may also be provided such that it is essentially deep relative to the width thereof. It is to be noted that even though the bars of the FIG. 3 disclosure are having an essentially rectangular sectional shape, they may also, if necessary, differ from that, being for instance wedge-like, triangle-like or barrel-like or concave and/or inclined from some surfaces thereof without departing from the general idea of the invention.

In addition to the advantages in the field of manufacture, such as the improved easiness of attachment, decreased need for welding and more fast manufacture, it is possible to further prevent the formation of tangential currents by means of the rotor bar means 15 attached only from the other side thereof, whereby the characteristics of the solid rotor 10 correspond essentially the same of a laminated rotor in this sense and it is possible to partially separate the magnetic circuit and the electric circuit from each other. When a common target in general is, for instance, that the current travels axially in the rotor 10, ie. in the direction of the rotor bar 15, improves this kind of rotor arrangement further the motor characteristics obtainable by this invention, especially the efficiency coefficient of the motor.

It is possible to easily arrange the short circuit ring means 18 and possible groove and bar means 14, 15 arranged in connection with the rotor means 10 such that no negative effect will be caused to the stability of the balance of the rotor means. By means of this a use of rolling bearings, such as ball bearings, is enabled in the rotatable supporting of the rotor means, since the inventive rotor means remains well in balance in different rotational speeds. The well balanced solid rotor does not "live" and thus it does not cause increasing bearing loads.

FIG. 4 discloses a test arrangement, which shows the test results accomplished for a solid rotor motor provided with short circuit rings in accordance with the invention. In the tests so called frequence converter 6 was adapted between the motor 1 and the power supply 3, which in the test was a public electrical network. Said converter means are per se known, and commercially available. The arrangement comprises further a generator 4, and a torque metering sensor 5 adapted between the generator 4 and the motor 1. In addition, second frequency converter means 7 are disclosed, which are connected between said generator and the electrical network 3. The test arrangement connection is such that all of that energy which equals the losses of the drive is taken from the network 3, and that the power of the motor 1 is converted in the generator to electrical energy, which is returned to the intermediate circuit which is common to the frequency converters and connected in parallel.

In another test the corresponding arrangement was used to test the effect which is obtainable to the inventive arrangement through a filtering solution according to that what is disclosed in applicant's at the application date non-public FI patent application No. 962485. Said FI application is incorporated herein as reference.

The line diagrams of FIG. 5 show the test results obtained for the efficiency from a comparison, in which the inventive solid rotor construction was studied when using 140 Hz current supply with and without filtering, wherein:

Curve 1: a rotor with a Cu short circuit ring in accordance with the invention, no filtering.

Curve 2: a rotor with a Cu short circuit ring in accordance with the invention, filtering.

The vertical axis presents the measured efficiency [%] and the horizontal axis the power $P_{mek}$ [kW].

As can be seen from the figure, an essentially good efficiency is obtained by means of the short circuit ring. It is possible to obtain an essential improvement in the efficiency by the motor 1 including the inventive rotor means, which is not provided with a filtering in accordance with said FI application No. 962485 (curve 1), especially in the higher powers, than what the known solutions are capable of providing.

An especially good efficiency is provided by the solution in which the inventive short circuit rings are combined with the filtering arrangement of said FI 962485 (curve 2). In accordance with the curve 2, the maximum power obtained by this solution is essentially higher than what can be obtained by the prior art solutions.

In some further tests the inventive solid rotor solution based on the short circuit rings was also compared to rotors which were provided with various coatings (eg. AlFe+Cu and AlFe coatings having different aluminium contents). In these it was, for instance, found that by a machine provided with the inventive short circuit rings essentially better characteristics were obtained in view of the torque and power than by said rotors coated from the rotor circumference thereof. It is to be noted that the manufacture and attachment of the inventive short circuit rings is also easier and more economical to accomplish than the known coating methods, and thus the invention provides several clear advantages in view of the prior art coatings.

Thus the invention provides an apparatus and a method, by means of which an essential improvement is achieved to the characteristics of the solid rotor machines, which motors are applicable in applications requiring an improved starting torque and increased rotational speed. The inventive rotor structure is, however, simple from the structure thereof and easy to manufacture, and is thus also economical to implement, and reliable in operation thereof. The solid rotor structure according to the present invention provides an efficiency corresponding to the same of a laminated rotor, and improved starting torque characteristics in network use, and allows increased rotational speeds when used together with the inverters. The structure is applicable to the electric machines (motors and generators) in the most common power ranges, even up to 1MW.

It is to be noted that the foregoing examples of the embodiments of the invention are not limiting the scope of the invention defined by the claims.

What is claimed is:

1. A solid rotor of an electric machine, comprising a short circuit ring (18) of a metal material having good electrical conductivity, attached to end face (11) of the rotor (10), wherein the short circuit ring (18) comprises at least two portions (18, 18") formed of different materials, and wherein a first portion (18") of said short circuit ring attached to the rotor is of material having essentially similar characteristics to the characteristics of the material of the rotor (10).

2. A rotor according to claim 1, wherein a second portion (18') of the short circuit ring is provided of material having a better electrical conductivity than the first portion (18") attached to the rotor (10) has.

3. A rotor according to claim 1, wherein the short circuit ring (18) comprises a bimetal sheet (18', 18"), said bimetal sheet comprising one of steel-copper sheet (FeCu), steel-aluminum sheet (FeAl), and Steel-brass sheet.

4. A rotor according to claim 1, wherein the rotor (10) further comprises grooves (14) extending essentially longitudinally on the surface thereof.

5. A rotor according to claim 4, wherein a rotor bar (15) is disposed in the groove (14), said rotor bar comprising at least two portions (15', 15") from which a first portion (15') is of material having a better electrical conductivity than the rotor, and a second portion (15") is of essentially similar material to the rotor.

6. A rotor according to claim 5, wherein the rotor bar (15) is attached to the rotor by one of electron beam welding, laser welding and soldering.

7. A rotor according to claim 1, wherein the short circuit ring (18) is attached to the rotor material by one of electron beam welding, laser welding and soldering.

8. A rotor according to claim 1, the rotor forming a part of an electric motor arrangement, said arrangement comprising a stator and means for filtering current supplied to the motor.

9. A rotor according to claim 1, wherein the short circuit ring (18) is arranged in connection with the rotor (10) such that a stability of the balance of the rotor is not negatively affected, said rotor further comprising a rolling bearing rotatably supporting the rotor.

10. A solid rotor as recited in claim 1, wherein said metal material comprises at least one of copper, aluminum, bronze and brass.

11. A method of energizing a solid rotor of an electric machine, said method comprising guiding of electric current of the rotor and/or affecting to the resistivity thereof by means of a short circuit ring provided on the end face of the rotor, said short circuit ring being formed of a material having a better electrical conductivity than of a material of the rotor, wherein the short circuit ring is provided by attaching an annular piece provided from a bimetal sheet, such as steel-copper sheet, steel-aluminum sheet, steel-brass sheet, on the end face of the solid rotor from a such portion thereof which comprises material that essentially corresponds to the material of the rotor.

12. A method according to claim 11, wherein the short circuit ring is attached by one of electron beam welding, laser welding, friction welding, and by soldering.

13. A method according to claim 11, further comprising a step of filtering of the current supplied to the electric motor.

14. A rotor of an electric machine, said rotor comprising:
a solid rotor portion having at least one end face;
a short circuit ring attached to said at least one end face, said short circuit ring comprising a first portion adjacent said at least one end face and a second portion adjacent said first portion, said first portion and said second portion being formed of different materials.

15. A solid rotor as recited in claim 14, wherein said solid rotor portion comprises a metal material having electrical conductivity, said metal material comprising at least one of copper, aluminum, bronze, and brass.

16. A solid rotor as recited in claim 15, wherein said first portion of said short circuit ring comprises a material having equivalent characteristics to the metal material of said rotor portion.

17. A solid rotor as recited in claim 14, wherein one of said first portion and said second portion of said short circuit ring comprises a material having a higher electrical conductivity than another of said first portion and said second portion.

18. A rotor as recited in claim 14, wherein said solid rotor portion includes at least one groove in an outer portion thereof, said rotor further comprising at least one rotor bar disposed in said at least one groove, wherein an inner shape of the groove essentially corresponds to an outer shape of the rotor bar.

19. A rotor as recited in claim 18, wherein said at least one rotor bar comprises a first portion and a second portion, said first portion being of a first material and said second portion being of a second material, said first and second materials being different.

20. A method of manufacturing a solid rotor for an electric machine, said method comprising the steps of:
providing a solid rotor portion formed of a metal material, said rotor portion having at least one end face;
providing a short circuit ring, said short circuit ring including a first portion and a second portion thereof, said first portion and second portion being formed of different conductive materials, said first portion comprising one side of said short circuit ring and said second portion comprising a second side of said short circuit ring;
attaching said short circuit ring to said end face of said solid rotor portion, wherein said first portion of said short circuit ring is in contact with said end face.

21. A method as recited in claim 20, wherein said first portion of said short circuit ring comprises a metal material having essentially the same characteristics as the material of the solid rotor portion.

22. A method as recited in claim 20, wherein said step of providing the solid rotor portion includes providing the solid rotor portion being formed of one of copper, aluminum, bronze, and brass.

* * * * *